US012475106B2

(12) United States Patent
Shan et al.

(10) Patent No.: US 12,475,106 B2
(45) Date of Patent: Nov. 18, 2025

(54) METHOD, APPARATUS, DEVICE AND STORAGE MEDIUM FOR DATA COMPARISON OF STORAGE MODULE

(71) Applicant: Black Sesame Technologies (Chongqing) Co., Ltd., Chongqing (CN)

(72) Inventors: Yicheng Shan, Shenzhen (CN); Maosheng Xue, Shenzhen (CN)

(73) Assignee: Black Sesame Technologies (Chongqing) Co., Ltd. (CN)

( * ) Notice: Subject to any disclaimer, the term of this patent is extended or adjusted under 35 U.S.C. 154(b) by 196 days.

(21) Appl. No.: 18/386,329

(22) Filed: Nov. 2, 2023

(65) Prior Publication Data

US 2024/0143579 A1    May 2, 2024

(30) Foreign Application Priority Data

Nov. 2, 2022 (CN) .......................... 202211367860.X

(51) Int. Cl.
   *G06F 16/23* (2019.01)
(52) U.S. Cl.
   CPC ................................ *G06F 16/2379* (2019.01)
(58) Field of Classification Search
   CPC .................................................. G06F 16/2379
   See application file for complete search history.

(56) References Cited

U.S. PATENT DOCUMENTS

| 5,530,933 | A | * | 6/1996 | Frink | ................... | G06F 12/0831 |
| | | | | | | 711/119 |
| 2015/0261903 | A1 | * | 9/2015 | Jose | ...................... | G06F 11/261 |
| | | | | | | 716/136 |
| 2020/0104393 | A1 | * | 4/2020 | Setty | ...................... | H04L 9/3239 |
| 2022/0245133 | A1 | * | 8/2022 | Li | ........................ | G06F 16/2379 |

OTHER PUBLICATIONS

Sangani, Hardi, and Usha Mehta. "Uvm based verification of read and write transactions in axi4-lite protocol." 2022 IEEE region 10 symposium (TENSYMP). IEEE, 2022. (Year: 2022).*

(Continued)

*Primary Examiner* — Mohsen Almani
(74) *Attorney, Agent, or Firm* — Tmothy T. Wang; Ni, Wang & Massand, PLLC

(57) ABSTRACT

The present application relates to data comparison of a storage module. A method includes monitoring read transactions and write transactions, storing a write transaction that is in-transit and a write transaction that has ended but may have a read-write conflict with a read transaction, storing a read transaction that is in-transit and a read transaction that has ended but has not completed data comparison, and performing a data comparison on each ended read transaction by using a scoreboard. When a data comparison between a read data value in the ended read transaction and a value at a corresponding address in a reference model fails, and a data comparison between the read data value and a write data value and/or an original value of one write transaction passes, a data comparison on the ended read transaction passes. This method may improve an accuracy of determining an abnormity of a storage module.

12 Claims, 7 Drawing Sheets

(56) References Cited

OTHER PUBLICATIONS

Ma, Rui. "An Application of the Universal Verification Methodology." (2016). (Year: 2016).*

Fiergolski, Adrian. "Simulation environment based on the Universal Verification Methodology." Journal of Instrumentation 12.01 (2017): C01001. (Year: 2017).*

Spear, Michael F., et al. "Conflict detection and validation strategies for software transactional memory." International Symposium on Distributed Computing. Berlin, Heidelberg: Springer Berlin Heidelberg, 2006. (Year: 2006).*

* cited by examiner

|  | address 1 | address 2 | address 3 | address 4 | address 5 | address 6 |
|---|---|---|---|---|---|---|
| Write transaction 1 | Byte write data value 11 and byte original value 11 | Byte write data value 12 and byte original value 12 | Byte write data value 13 and byte original value 13 | | | |
| Write transaction 2 | | | | Byte write data value 24 and byte original value 24 | Byte write data value 25 and byte original value 25 | Byte write data value 26 and byte original value 26 |
| Write transaction 3 | | Byte write data value 32 and byte original value 32 | Byte write data value 33 and byte original value 33 | Byte write data value 34 and byte original value 34 | Byte write data value 35 and byte original value 35 | |

FIG. 6

METHOD, APPARATUS, DEVICE AND STORAGE MEDIUM FOR DATA COMPARISON OF STORAGE MODULE

RELATED APPLICATION

This application claims the benefit under 35 U.S.C. § 119(a) of the filing date of Chinese patent application No. 202211367860.X, filed in the Chinese patent office on Nov. 2, 2022. The disclosure of the foregoing application is herein incorporated by reference in its entirety.

FIELD OF THE INVENTION

The present application relates to the field of data verification technologies, and in particular, to a method, an apparatus, a computer device, and a storage medium of data comparison for a storage module.

BACKGROUND OF THE INVENTION

Universal Verification Methodology (UVM) is a technique for verifying a Design Under Test (DUT). Generally, a reference model for simulating the function of a DUT is built in a UVM verification platform, and a scoreboard in the UVM verification platform compares an output of the DUT with an output of the reference model to determine whether a behavior of the DUT is consistent with expectation, so as to determine whether an abnormality exists in the DUT.

Taking a storage module as an example of a DUT, when a UVM verification platform is used to verify the storage module, the UVM verification platform may access the storage module through an interface of the storage module, and compare and check read data and write data monitored from the interface. For example, when a read data is monitored, a scoreboard is used for performing a data comparison on the read data with corresponding data in the reference model to determine whether the data comparison passes, and if not, the storage module is possibly abnormal.

For a storage module using an interface (for example, an Advanced Extensible Interface, AXI) in which a read channel and a write channel are independent of each other, when the storage module using such type of interface is verified by using a UVM verification platform, due to an independence between the read and write channels of such type of interface and non-stationarity of delay of data from the interface to an internal memory circuit, when read and write operations are performed almost simultaneously and a same address is operated, a read-write conflict situation may exist. In this situation, a read data of a read operation monitored by the UVM verification platform from the interface may be a value monitored from the interface before an update of a write data of a write operation, or may be a value after the update of the write data of the write operation.

This uncertainty in the read data monitored by the UVM verification platform from the interface in the possible presence situation of read-write conflict presents a challenge to the design of a reference model for the UVM verification platform. That is, it is difficult to design a reference model to accurately simulate the same read-write conflict processing characteristics as that of a storage module using such type of interface. If the designed reference model cannot accurately simulate the characteristics, abnormal mis-determination situations that data comparison fails but the storage module actually operates normally due to the uncertainty of the monitored read data may occur. Therefore, the accuracy of determining the abnormity of the storage module with such kind of interface is lowered.

SUMMARY OF THE INVENTION

In view of the foregoing, it is necessary to address the above technical problem(s) to provide a method, an apparatus, a computer device, and a storage medium of data comparison for a storage module, to be able to improve an accuracy of determining an abnormality of the storage module using an interface in which a read channel and a write channel are independent of each other.

A method of data comparison for a storage module, comprises:
  monitoring, using a monitor, read transactions and write transactions of the storage module;
  storing, in a write transaction queue, a write transaction that is in-transit and a write transaction that has ended but may have a read-write conflict with a read transaction in a read transaction queue;
  storing, in the read transaction queue, a read transaction that is in-transit and a read transaction that has ended but has not completed data comparison; and
  performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

An apparatus of data comparison for a storage module, comprises:
  a monitor module configured for monitoring, using a monitor, read transactions and write transactions of the storage module;
  a write transaction queue management module configured for storing, in a write transaction queue, a write transaction that is in-transit and a write transaction that has ended but may have a read-write conflict with a read transaction in a read transaction queue;
  a read transaction queue management module configured for storing, in the read transaction queue, a read transaction that is in-transit and a read transaction that has ended but has not completed data comparison; and
  a data comparison module configured for performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

A computer device comprises a memory and a processor, the memory stores a computer program, and based on executing the computer program, the processor implements following steps:
  monitoring, using a monitor, read transactions and write transactions of the storage
  storing, in a write transaction queue, a write transaction that is in-transit and a write transaction that has ended but may have a read-write conflict with a read transaction in a read transaction queue;
  storing, in the read transaction queue, a read transaction that is in-transit and a read transaction that has ended but has not completed data comparison; and
  performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

A computer-readable storage medium stores thereon a computer program which, based on being executed by a processor, implements steps of:
  monitoring, using a monitor, read transactions and write transactions of a storage module;
  storing, in a write transaction queue, a write transaction that is in-transit and a write transaction that has ended but may have a read-write conflict with a read transaction in a read transaction queue;
  storing, in the read transaction queue, a read transaction that is in-transit and a read transaction that has ended but has not completed data comparison; and
  performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

In the above method, apparatus, computer device, and storage medium of data comparison for a storage module, read transactions and write transactions of the storage module are monitored through a monitor, and related states of the read transactions and the write transactions are tracked and recorded by utilizing a read transaction queue and a write transaction queue, so that based on a data comparison is performed, based on a data comparison between a read data value in the current read transaction and a data value of a corresponding address in a reference model fails, a write data value and an original value of a corresponding address in a write transaction which may have a read-write conflict with the read transaction are used as alternative values of the reference model to perform data comparison with the read data value in the read transaction, and as long as the read data value in the read transaction can pass the data comparison with one of the alternative values of the corresponding address, the data comparison of the current read transaction is considered to pass. Therefore, the abnormal mis-determination situation that a data comparison fails while an actual operation of the storage module is normal due to the uncertainty of the read data monitored when there may be a read-write conflict is avoided, and an accuracy of the abnormal determination of a storage module using an interface with mutually independent read channel and write channel is effectively improved. In addition, it is also avoided to develop a complex reference model to accurately simulate the read-write conflict processing characteristics similar to that of a storage module using an interface with a read channel and a write channel which are independent of each other. Namely, a developed reference model even if being not able to simulate the read-write conflict characteristics can also be applied to the above solution of the present application, which has a positive meaning for accelerating the development progress of actual engineering projects and reducing development costs.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings:

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

FIG. 6 is a schematic structural diagram of an alternative value group in one example of the present application;

DETAILED DESCRIPTION OF THE INVENTION

Figure 1:
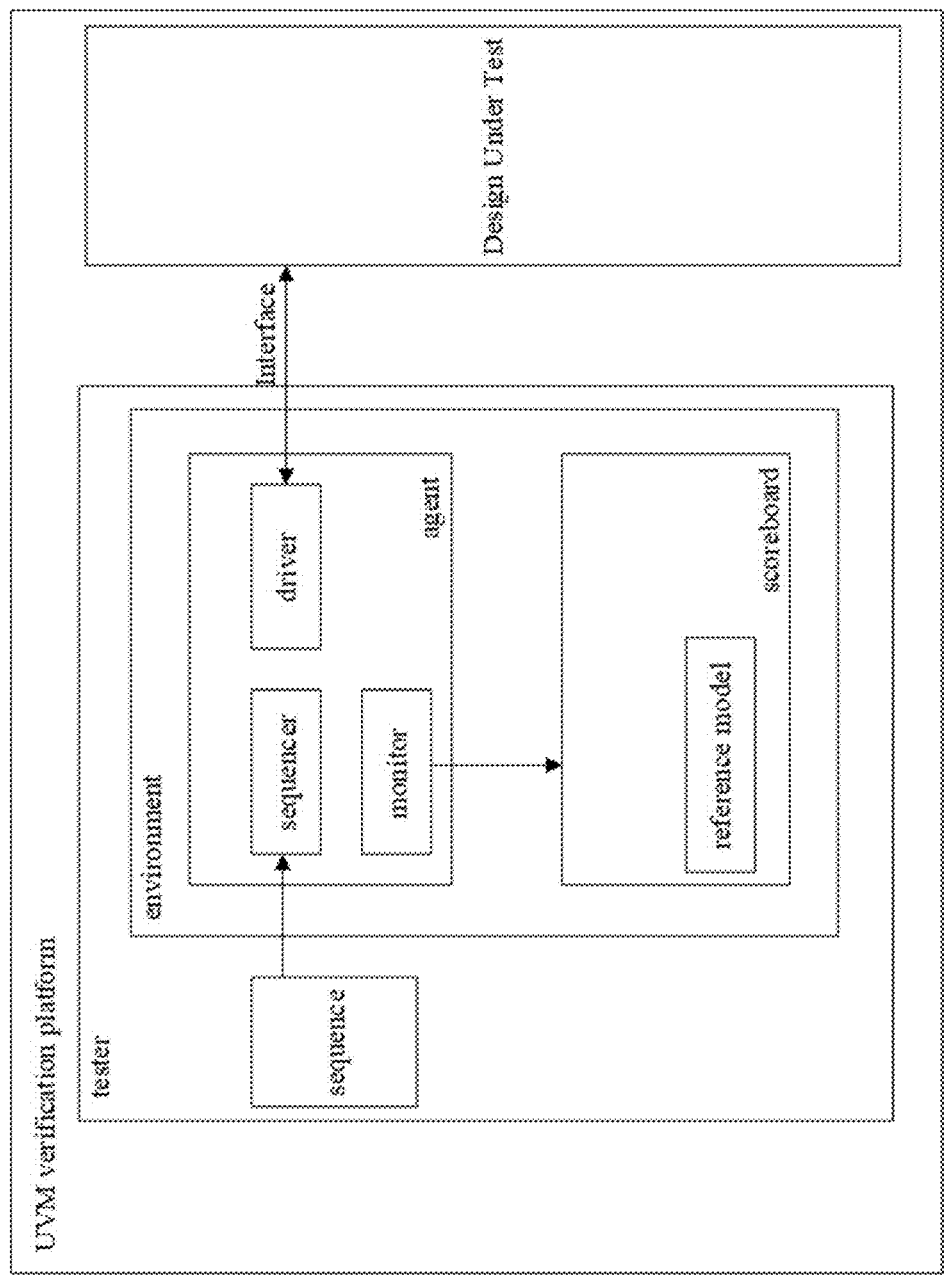
FIG. 1 is a schematic structural diagram of a UVM verification platform according to an embodiment of the present application.

The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications, and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112, ¶ 6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

In order to make objects, technical solutions and advantages of the present application more clearly understood, the present application is described in further detail below with reference to accompanying drawings and embodiments. It should be understood that specific embodiments described herein are merely illustrative of the present application and are not intended to limit the present application.

A method of data comparison for a storage module provided by the instant application may be applied to a UVM verification platform shown in FIG. 1. The UVM verification platform may be configured on a server, for example, and the server may be implemented as an independent server or a server cluster including a plurality of servers. A design under test is placed in the UVM verification platform, for example, the design under test accesses the UVM verification platform through an interface, so that the UVM verification platform is used for verifying the design under test. In embodiments of the present application, the design under test may be a storage module using an interface where a read channel and a write channel are independent of each other. Taking an AXI as an example of the interface, the UVM verification platform may access the design under test of the storage module having the AXI through the interface. Referring to FIG. 1, as is known in the art, the UVM verification platform may have various components including a sequence (sequence), an agent (agent) (in this application, correspondingly an AXI agent (axi_agent) since an AXI is used an example), a sequence generator (sequencer), a driver (driver), a monitor (monitor), a scoreboard (scoreboard), and a reference model (reference model). The UVM verification platform executes the method for data comparison of the storage module of embodiments of the instant application to verify the accessed storage module, and a scoreboard of the UVM verification platform provides a data comparison result of whether the data comparison passes or not, wherein a data comparison is a process of comparing whether two data values are the same or not. Based on the data comparison passing, namely the two compared data values being the same, the storage module as the tested design may be considered to operate normally, and based on a failure of the data comparison, namely the two compared data values being different, the storage module as the tested design is considered to be possibly abnormal.

It may be understood that, for ease of description, the present application uses an AXI as an example and accordingly uses elements of an AXI agent, an AXI bus, an AXI transaction, etc. that are suitable for the AXI. However, other interfaces in which read channels and write channels are independent of each other are also possible, and correspondingly these elements may be accordingly replaced with elements suitable for the other interfaces.

Figure 2:
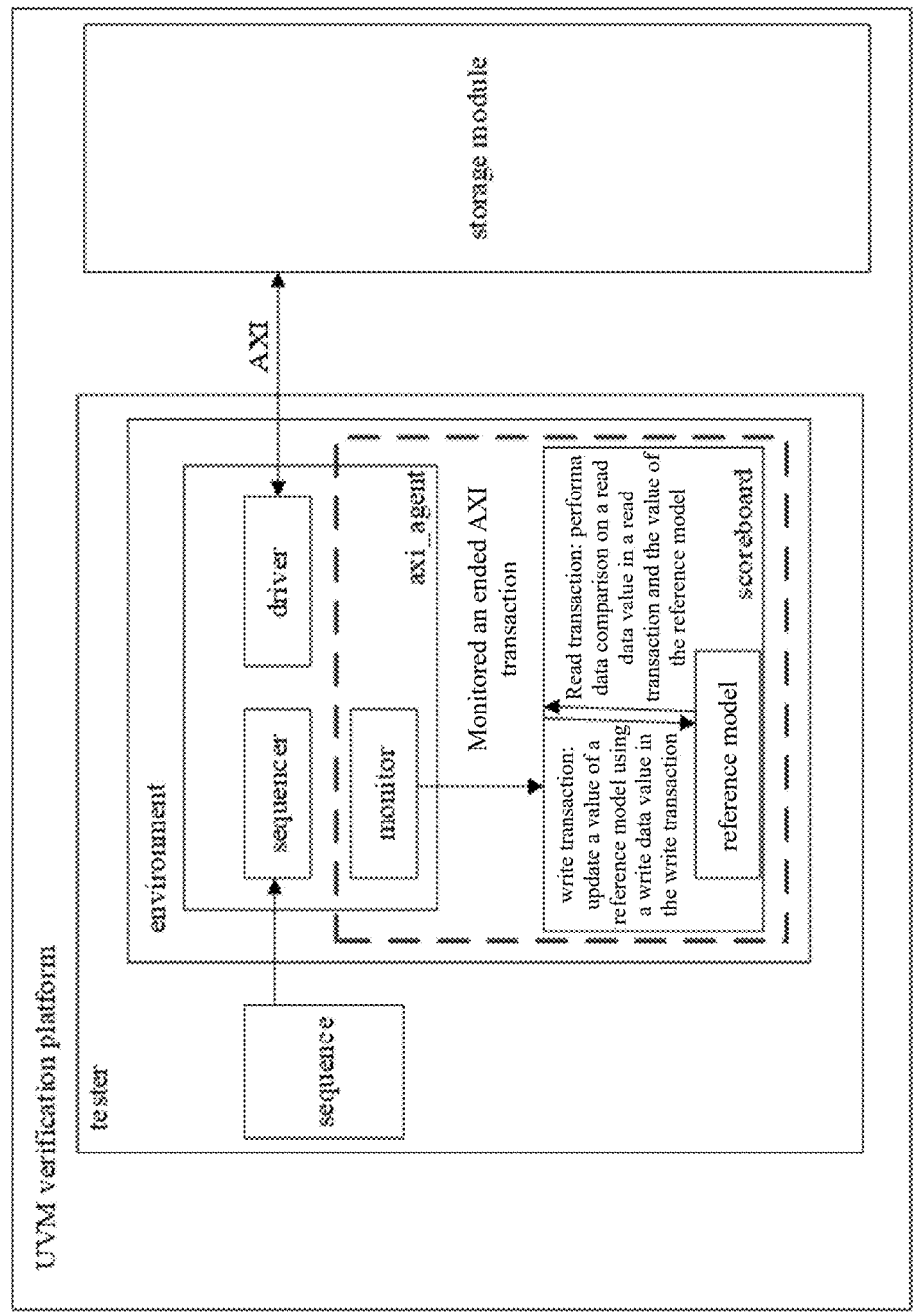
FIG. 2 is a schematic diagram illustrating a UVM verification platform verifying a storage module according to an example of a conventional technique.

Referring to FIG. 2, FIG. 2 is a schematic diagram illustrating a UVM verification platform verifying a tested storage module according to an example of a conventional technique. In an example scenario of conventional techniques, when a complete AXI transaction (which may be a read transaction or a write transaction) ends, a monitor will then monitor the ended AXI transaction from the AXI, and pass it to a reference model for processing, and finally perform a data comparison in a scoreboard. Specifically, based on the monitor monitoring an ended read transaction or write transaction, using a write( ) method of UVM TLM communication the following operations are implemented: if a write transaction is monitored, updating a corresponding value in the reference model by using the write transaction; and if a read transaction is monitored, performing a data comparison by using a value of the read transaction and a value in the reference model to give a data comparison result of whether the data comparison passes or not.

When the above-described conventional technique is applied to a storage module as a design under test and with an interface (for example, an AXI) in which a read channel and a write channel are independent of each other, it is difficult to develop a complex reference model to simulate the read-write conflict processing characteristics of the storage module using such type of interface. However, when a reference model that cannot simulate such read-write conflict processing characteristics is used, an expected output value cannot be accurately predicted, and an accurate data comparison cannot be achieved. Specifically, in the above-mentioned conventional technique, when a reference model that cannot simulate such read-write conflict processing characteristics is used, when a read operation conflicts with a write operation, a read data monitored on an interface may be a value before update of a write data of the write operation, and when subsequently a scoreboard performs a data comparison, a value in the reference model may be a value after update of the write data of the write operation, and then the scoreboard of the above described conventional technique performs the data comparison between the read data and the value in the reference model to obtain a data comparison result that the data comparison fails, while the storage module may actually operate normally at this time, so that an abnormal mis-determination situation is likely to occur.

In order to solve at least one technical problem in the above conventional technical solutions, the present application provides a method of data comparison for a storage module, to improve an accuracy of abnormality determination for a storage module using an interface in which a read channel and a write channel are independent of each other.

Figure 3:
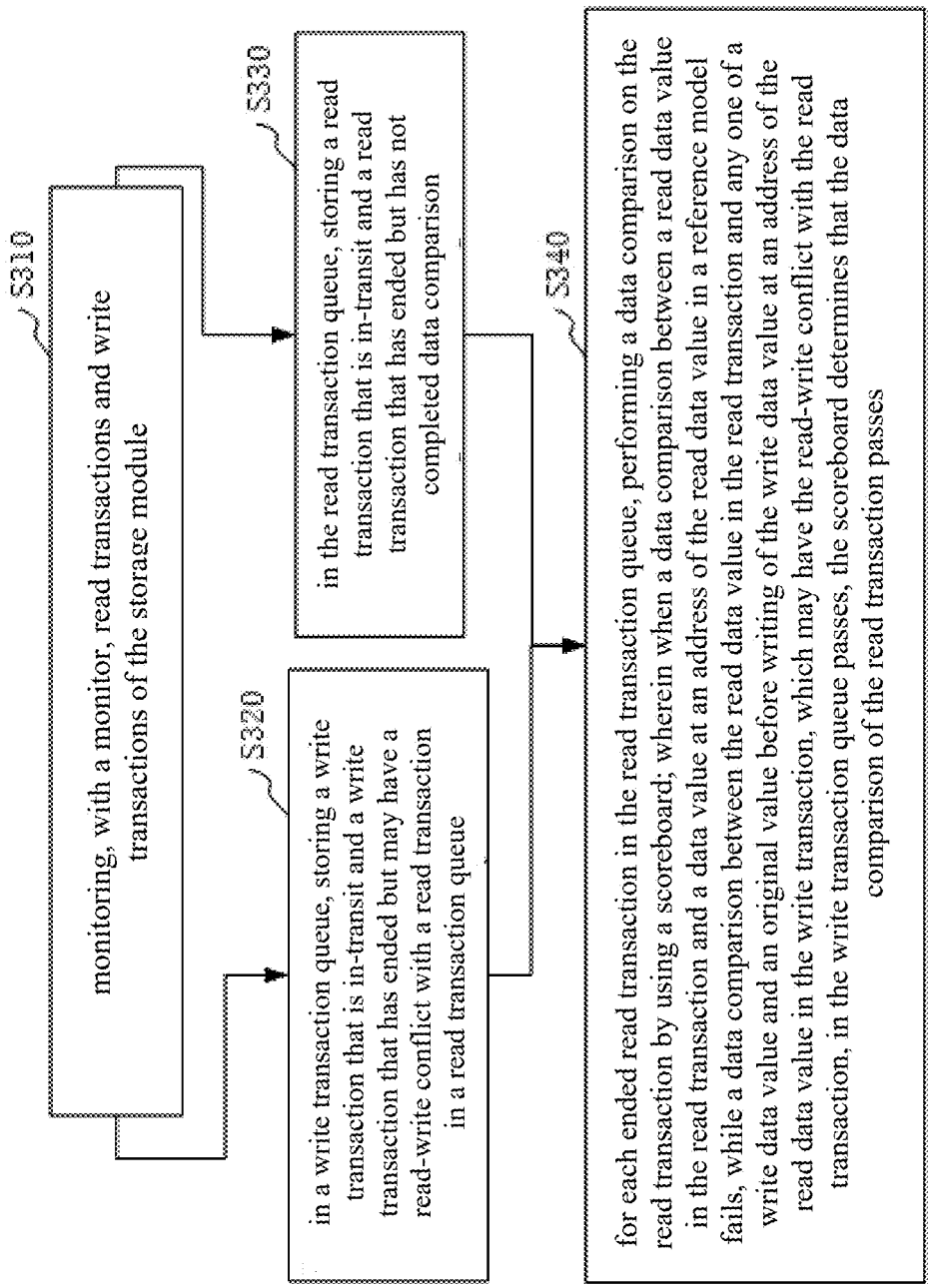
FIG. 3 is a schematic flow chart illustrating a method of data comparison for a storage module according to an embodiment of the present application.

In one embodiment, as is shown in FIG. 3, the present application provides a method of data comparison for a storage module, and is described by taking an application of the method to the UVM verification platform in FIG. 1 as an example. The method may include following steps S310 to S340.

S310, monitoring, using a monitor, read transactions and write transactions of the storage module.

In this step, the monitor of the UVM verification platform monitors each read transaction or write transaction of the storage module under test from an AXI through an AXI bus.

Further, unlike the foregoing conventional technique that only monitors ended read transactions and ended write transactions, in one embodiment, the monitor of the present application monitors each of started read transactions, started write transactions, ended read transactions and ended write transactions of the storage module, so as to manage the read transaction and the write transaction in different states by using a write transaction queue and a read transaction queue to be described in subsequent steps.

Figure 4:
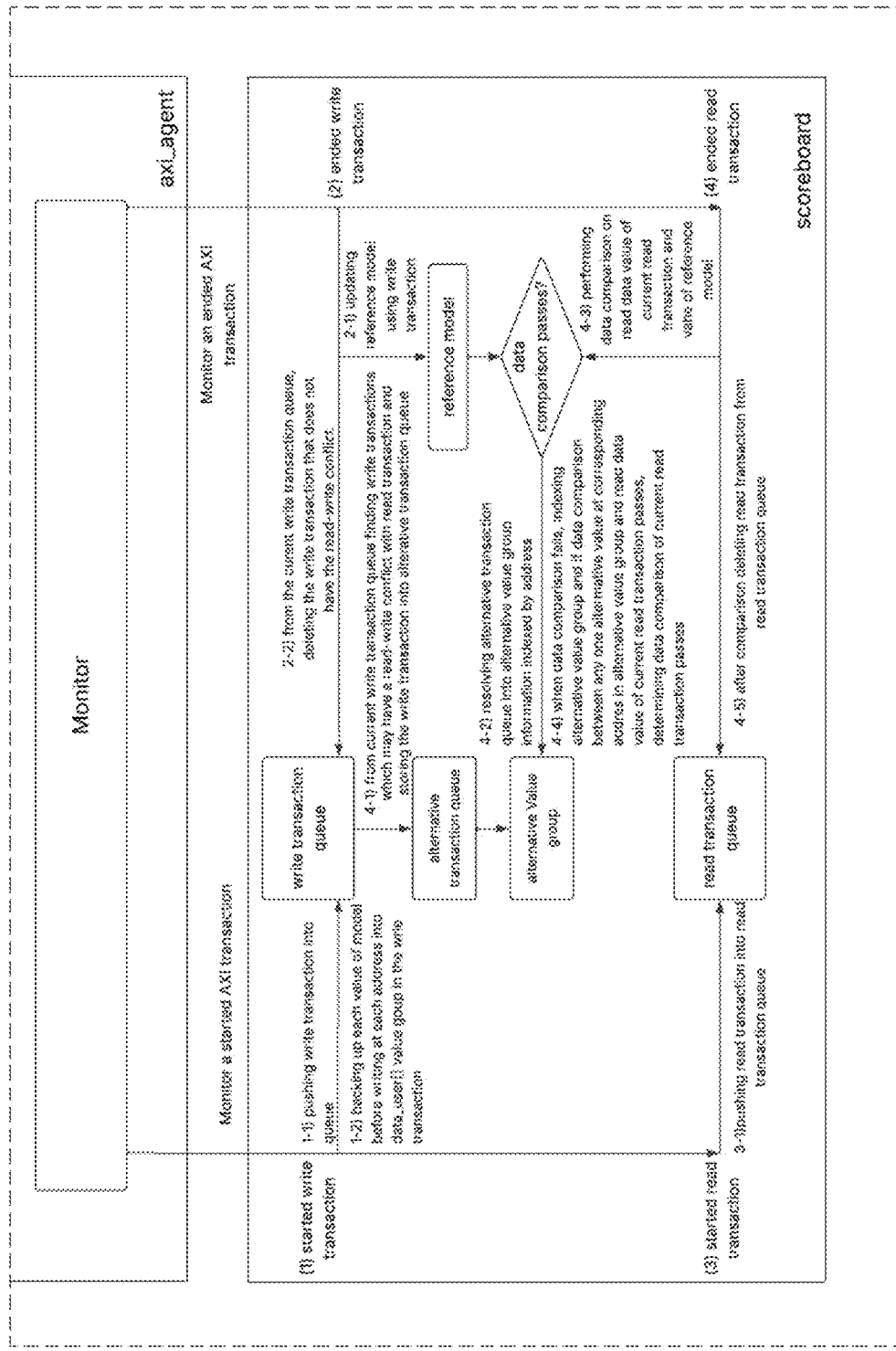
FIG. 4 is a schematic diagram illustrating a UVM verification platform verifying a storage module according to an example of the present application.

By way of example, referring to FIG. 4, FIG. 4 is a schematic diagram illustrating a UVM verification platform verifying a storage module according to an example of the present application, wherein FIG. 4 specifically illustrates a portion of the example solution in which an improvement is made to a portion within a dashed box in the conventional solution illustrated in FIG. 2, while the rest of the example solution may be the same as those in FIG. 2.

The difference between the exemplary solution shown in FIG. 4 and the conventional scoreboard solution is that for an AXI transaction on an AXI bus, a monitor monitors the AXI transaction at the start and the end of the AXI transaction by using different UVM Transaction Level Modeling (TLM) ports, respectively. Specifically, two sets of UVM TLM ports for monitoring AXI transactions may be used on the monitor side, and include a start port (item_started_port) and an observation port (item_observed_port). The start port monitors an AXI transaction on an AXI bus at a start time when the AXI transaction starts and the observation port monitors the AXI transaction on the AXI bus at an end time when the AXI transaction ends.

S320, storing, in a write transaction queue, a write transaction that is in-transit and a write transaction that has ended but may have a read-write conflict with a read transaction in a read transaction queue.

A write transaction is a transaction used for updating data in the storage module, a write transaction generally carries write data to be written and an address to be written of the write data, and the write transaction is used for updating the write data carried by the write transaction to the address to be written of the write data in the storage module.

A write transaction that is in-transit refers to a write transaction that has started but not yet ended.

In the present application, by monitoring the read transaction and the write transaction with the monitor in the foregoing step S310, the monitored write transaction may be managed in the write transaction queue.

In one embodiment, the above step S320 may include: pushing a started write transaction into a write transaction queue based on the monitor monitoring the started write transaction in the step S310; based on the monitor monitoring an ended write transaction in the step S310, determining whether each write transaction in the write transaction queue may have a read-write conflict with a read transaction in the read transaction queue, and deleting the write transaction having no read-write conflict with the read transaction in the read transaction queue from the write transaction queue.

For example, whenever a monitor monitors an AXI transaction at a port, the UVM verification platform may perform a corresponding step using the write( ) method of MVU TLM communication according to the type of the monitored AXI transaction.

For example, referring to FIG. 4, each time the monitor monitors a started write transaction at the start port, the UVM verification platform may perform a step of: (1-1) pushing the started read write transaction into a write transaction queue in the scoreboard. Whenever the monitor monitors an ended write transaction at the observation port, the UVM verification platform may perform a step of: (2-2) performing a first read-write conflict determination on each write transaction [i] in all write transactions which have received write responses in the current write transaction queue and each read transaction [j] in the current read transaction queue one by one, so as to screen out M write transactions which do not have a read-write conflict with all read transactions in the current read transaction queue, and deleting the M write transactions from the queue. M may be an integer greater than or equal to zero.

By the solution in this embodiment, the write transaction queue is updated each time a started write transaction or an ended write transaction is monitored, so that the write transactions stored in the write transaction queue may be kept as write transactions that are in-transit and write transactions that have ended but may have a read-write conflict with the read transactions in the read transaction queue.

In an embodiment, the above determining whether there may be a read-write conflict between each write transaction in the write transaction queue and a read transaction in the read transaction queue, includes: for each write transaction in the write transaction queue, based on at an end time of the current write transaction an end event of any one read transaction in the read transaction queue is not triggered or just triggered, and an address accessed in the read transaction and an address accessed in the current write transaction overlap, determining that there may be a read-write conflict between the current write transaction and the read transaction.

Illustratively, in the above step (2-2), each write transaction [i] of all write transactions in the current write transaction queue that have received write responses may be subjected to the following first read-write conflict determination with each read transaction [j] in the current read transaction queue one by one:
    determination condition ①: at an end time of the write transaction [i], an end event of the read transaction [j] is not triggered or just triggered;
    determination condition ②: an address accessed in the read transaction [j] overlaps with an address accessed in the write transaction [i];
    based on the determination conditions ① and ② are simultaneously met, determining that the write transaction [i] and the read transaction [j] may have a read-write conflict; otherwise, determining that the write transaction [i] does not have a read-write conflict with the read transaction [j].

By repeating the above first read-write conflict determination, the determination of whether there may be a read-write conflict between all the write transactions that have received the write responses in the current write transaction queue and all the read transactions in the current read transaction queue may be completed.

In one embodiment, based on the monitor monitoring a started write transaction, the method further comprises: acquiring from the reference model an original value before writing of a write data value of the started write transaction at an address of the write data value, and recording the original value in the started write transaction.

Illustratively, referring to FIG. 4, each time the monitor monitors a started write transaction at the start port, the UVM verification platform may perform, in addition to the step (1-1), a step:
    (1-2) for each byte write data value of the started write transaction, the UVM verification platform may read a value at an address to which each byte write data value is to be written in the reference model as an original value before writing of each byte write data value, and backup the original value before writing of each byte write data value in a dynamic array for storing backup data in the write transaction.

With the arrangement in this embodiment, each time the monitor monitors a started write transaction, an original value before writing of a write data value at an address of the write data value to be written by the started write transaction in the reference model is recorded in the started write transaction, thereby facilitating a convenient subsequent recall of the original value of each write data value before its writing when needed.

In one embodiment, based on the monitor monitoring an ended write transaction, the method further comprises: updating a value at an address of a write data value in the reference model with the write data value in the ended write transaction.

For example, referring to FIG. 4, each time the monitor monitors an ended write transaction at the observation port, the UVM verification platform, before performing the step (2-2), may further perform the following step:
    (2-1) firstly, updating a value at a corresponding address in the reference model by using the information such as the address, the data, the burst type, the burst size, the burst length and the like in the ended write transaction.

By the solution in this embodiment, each time the monitor monitors an ended write transaction, the corresponding value in the reference model is updated by the ended write transaction, so that the reference model may keep a real-time simulation of the data value in the tested storage module.

S330, storing, in the read transaction queue, a read transaction that is in-transit and a read transaction that has ended but has not completed data comparison.

The read transaction is a transaction for reading data in the storage module, a started read transaction generally carries an address of read data to be read, the started read transaction is used for reading a value at an address of the read data to be read in the storage module, and the value is recorded in the read transaction, so that after the execution of the read transaction ends, the corresponding ended read transaction carries the address of the read data that is read and the read data that is read.

A read transaction that is in-transit refers to a read transaction that has started but not yet ended.

In the present application, by monitoring the read transaction and the write transaction with the monitor in the foregoing step S310, the monitored read transaction may be managed in the read transaction queue.

In one embodiment, the above step S330 may include: pushing a started read transaction into a read transaction queue based on the monitor monitoring the started read transaction; based on the monitor monitoring an ended read transaction, deleting the ended read transaction from the read transaction queue after performing a data comparison on the ended read transaction using a scoreboard to complete the data comparison on the ended read transaction.

For example, referring to FIG. 4, each time the monitor monitors a started read transaction at a start port, the UVM verification platform may perform a step: (3-1) pushing the started read transaction into a read transaction queue in a scoreboard. Whenever the monitor monitors an ended read transaction at an observation port, the UVM verification platform may, after performing a data comparison on the ended read transaction by using the scoreboard in the step S340 to complete the data comparison on the ended read transaction, perform the following step: (4-5) deleting the ended read transaction that has completed the data comparison from the read transaction queue.

Through the solution in this embodiment, the read transaction queue is updated each time a started read transaction or an ended read transaction is monitored, so that the read transactions stored in the read transaction queue may be kept as read transactions that are in-transit and read transactions that have ended but have not completed data comparison.

S340, performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

Figure 5:
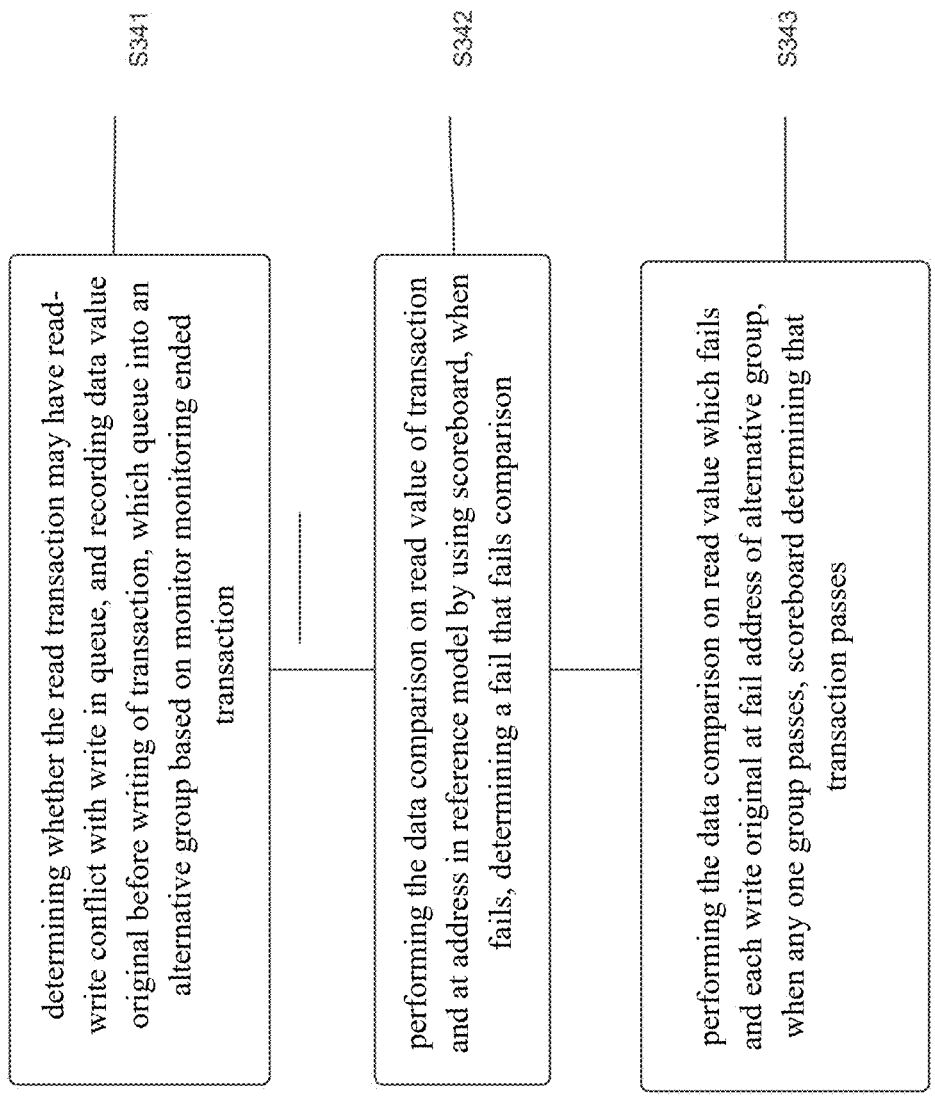
FIG. 5 is a schematic flow chart illustrating a data comparison step in one embodiment of the present application.

In one embodiment, referring to FIG. 5, the above step S340 may include steps S341 to S343:

step S341, based on the monitor monitoring an ended read transaction, determining whether the ended read transaction may have a read-write conflict with one write transaction in the write transaction queue, and recording a write data value and an original value before writing of the write data value of the one write transaction, which may have the read-write conflict with the ended read transaction, in the write transaction queue, into an alternative value group.

In one embodiment, the alternative value group in the step S341 may be an associated value group. An index value of the associated value group is an address corresponding to each unit write data value of a write transaction which may have a read-write conflict with the read transaction, and elements indexed by the index value are a unit write data value of the write transaction in each address of the write transaction which may have a read-write conflict with the read transaction and a unit original value before writing of the unit write data value.

The unit data value refers to a sub data value divided by a unit size. For example, in the case of a unit of byte, the unit write data may be byte write data divided in units of bytes, and the corresponding unit original value may be a byte original value divided in units of bytes. It may be appreciated that an X byte size data value may be divided into X unit byte size sub data values. By the solution in this embodiment, the write data values in the associated value group may be conveniently retrieved according to the unit write data values as required in subsequent steps, so that the data comparison efficiency in the subsequent steps is improved.

For example, referring to FIG. 4, each time the monitor monitors an ended read transaction [j] at the observation port, the UVM verification platform may, before performing the above step (4-5), firstly perform the following steps:

(4-1) performing a second read-write conflict determination on the monitored ended read transaction [j] and each write transaction [i] in the current write transaction queue, to screen out N write transactions which may have a read-write conflict with the ended read transaction [j] from the current write transaction queue, and storing the N write transactions into an alternative transaction queue in the scoreboard.

(4-2) resolving the N write transactions in the alternative transaction queue into an associated value group (alternative value group) taking a queue as an element. An index value of the associated value group is an address of each byte write data value, the indexed element is a queue, and the value in the queue is from each byte write data value at a corresponding address of the N write transactions in the alternative transaction queue and a byte original value corresponding to the byte write data value. It may be understood that, in the case that the original value corresponding to the write data has been backed up in each write transaction in the foregoing step (1-2), the byte original value corresponding to each byte write data value may be quickly acquired from the write transaction.

For example, referring to FIG. 6, based on there are 3 write transactions that may have a read-write conflict with the ended read transaction [j], namely a write transaction 1, a write transaction 2, and a write transaction 3, wherein a write data of the write transaction 1 may be divided by bytes into byte write data values 11-13, with corresponding write addresses of addresses 1-3, and corresponding pre-write original values of byte original values 11-13; a write data of the write transaction 2 may be divided by bytes into byte write data values 24-26, with corresponding write addresses of addresses 4-6, and corresponding pre-write original values of byte original values 24-26; and a write data of the write transaction 3 may be divided in bytes into byte write data values 32-35, with corresponding write addresses of addresses 2-5 and corresponding pre-write original values of byte original values 32-35. These 3 write transactions may be divided into byte write data values and respectively associated to corresponding index value addresses as is shown in FIG. 6, so that all byte write data values and byte original values existing at any addresses may be conveniently indexed using the addresses as indexes.

In one embodiment, in the step S341 determining whether the read transaction may have a read-write conflict with the write transaction in the write transaction queue includes: based on at an end time of the read transaction, an end event of any write transaction in the write transaction queue is not triggered or an end time of the write transaction is later than a start time of the read transaction, and an address accessed by the write transaction and an address accessed by the read transaction overlap, determining that the read transaction and the write transaction may have a read-write conflict. By means of the solution in the present embodiment, illustratively, in the above step (4-1) with the monitored ended read transaction [j] and each write transaction [i] in the current write transaction queue the following second read-write conflict determination may be performed:

determination condition ①: at an end time of the read transaction [j], an end event of the write transaction [i] is not triggered or an end time of the write transaction [i] is earlier than a start time of the read transaction [j];

determination condition ②: an address accessed in the write transaction [i] overlaps with an address accessed in the read transaction [j]; and based on the determination conditions ① and ② are simultaneously met, determining that the write transaction [i] and the read transaction [j] may have a read-write conflict; otherwise, determining that the write transaction [i] and the read transaction [j] do not have a read-write conflict.

By repeating the above second read-write conflict determination, a determination may be made as to whether there may be a read-write conflict between all write transactions in the current write transaction queue and the ended read transaction [j].

Step S342, performing a data comparison on a read data value of the ended read transaction and a value at an address of the read data value in a reference model by using a scoreboard, and based on a failure of the data comparison, determining a comparison fail address of the read data value that fails the data comparison.

Based on in the step S342 the data comparison between the read data value of the read transaction and the value at the address of the read data value in the reference model passes, the scoreboard determines that the data comparison of the current read transaction passes.

It may be understood that the present step S342 may be executed after the step S341 or before the step S341. For example, as an alternative, the step S342 is executed first based on the monitor monitoring an ended read transaction, and the step S341 is then executed based on in the step S342 determining that the data comparison between the read data value of the read transaction and the value at the address of the read data value in the reference model fails, whereas based on the data comparison in the step S342 passes, the scoreboard is already able to obtain the data comparison result that the data comparison of the current read transaction passes, and there is no need to execute the steps S341 and S343.

For example, referring to FIG. 4, each time the monitor monitors at the observation port an ended read transaction, the UVM verification platform may, before performing the above step (4-5), perform following steps:

(4-3) acquiring a read data of each beat (beat) in the current read transaction according to the information of the address, the data, the burst type, the burst size, the burst length, and the like in the read transaction, and performing a data comparison with a value at the corresponding address in the reference model.

The burst length represents a total number of beats of all read data in the current read transaction, and the burst size represents a data size of the read data in each beat. For example, based on the burst size of a read transaction is m and the burst length is n, then each beat corresponds to a data size of 2 m bytes, and accordingly, a total data size of all read data in the read transaction is 2 m*n bytes.

(4-4) based on a data comparison of a read data value of a certain beat fails, then:

traversing each byte read data value in the read data value of this beat, and performing a data comparison on each byte read data value and a value at a corresponding address in the reference model to find out all addresses corresponding to the byte read data values which fail the data comparison.

Step S343, performing a data comparison on the read data value that fails the data comparison with each write data value and each original value at the comparison fail address in the alternative value group, and based on the read data value that fails the data comparison passes the data comparison with any one of each write data value and each original value at the comparison fail address in the alternative value group, the scoreboard determining that the data comparison of the read transaction passes.

For example, referring to FIG. 4, after, in the step (4-4), finding out addresses corresponding to all the byte read data values that fail the data comparison, in the present step, the found addresses corresponding to these byte read data values may be used to index into the alternative value group, and for each address in the addresses corresponding to these byte read data values, based on the byte read data value at this address passes the data comparison with any one of several byte write data values and the byte original values at the same address in the alternative value group, this byte read data value is determined to pass the data comparison, so as to complete further data comparisons one by one for all the byte read data values that do not pass the data comparisons and are found in the step (4-4). Based on all the byte read data values which do not pass the data comparisons respectively pass this further data comparison, the scoreboard may determine that the data comparison of the read transaction passes, otherwise, based on one or more byte read data values of all the byte read data values which fail the data comparison still fail this further data comparison, the scoreboard determines that the data comparison of the read transaction fails.

For example, referring to FIG. 6, based on the step (4-4) finds that all the byte read data values which fail the data comparisons include a byte read data value a and a byte read data value b, an address of the byte read data value a is an address 3, and an address of the byte read data value b is an address 5, by indexing the alternative value group shown in FIG. 6 using the address 3 and the address 5, it may be obtained that alternative values at the address 3 include a byte write data value 13, a byte original value 13, a byte write data value 33, and a byte original value 33, and that alternative values at the address 5 include a byte write data value 25, a byte original value 25, a byte write data value 35, and a byte original value 35. Further performing a data comparison on the byte read data value a with each alternative value at the address 3 in the alternative value group, namely the byte write data value 13, the byte original value 13, the byte write data value 33 and the byte original value 33, as long as the data comparison between the byte read data value a and any one of the alternative values at the address 3 passes, the data comparison of the byte read data value a is considered to pass, otherwise, the data comparison of the byte read data value a is considered to fail. Similarly, performing a data comparison on the byte read data value b and each alternative value at the address 5 in the alternative value group, that is, the byte write data value 25, the byte original value 25, the byte write data value 35, and the byte original value 35, as long as the byte read data value b and any one alternative value at the address 5 pass the data comparison, the data comparison of the byte read data value b is considered to pass, otherwise, the data comparison of the byte read data value b is considered to fail. Based on the data comparisons of both the byte read data value a and the byte read data value b pass, the scoreboard may give a determination result that the data comparison of the read transaction passes, otherwise, based on any one of the data comparisons of the byte read data value a and the byte read data value b fails, the scoreboard may give a determination result that the data comparison of the read transaction fails, and may determine the byte read data value and the address thereof that do not pass the comparison.

That is, the scoreboard herein performs data comparisons on write data and corresponding original values of these write transactions that may have conflicts with the read transaction, also considered as the expected value output of the reference model, and the read data value of the read transaction.

After the data comparison for the currently ended read transaction is completed through the above steps (4-3) and (4-4), the step (4-5) may be performed to delete the ended read transaction that completed the data comparison from the read transaction queue.

In the above method for data comparison of the storage module, read transactions and write transactions of the storage module are monitored using a monitor, and related states of the read transactions and the write transactions are tracked and recorded by utilizing a read transaction queue and a write transaction queue, so that based on a data comparison is performed, based on a data comparison between a read data value in the current read transaction and a data value of a corresponding address in a reference model fails, a write data value and an original value of a corresponding address in a write transaction which may have a read-write conflict with the read transaction are used as alternative values of the reference model to perform a data comparison with the read data value in the read transaction, and as long as the read data value in the read transaction can pass the data comparison with one of the alternative values of the corresponding address, the data comparison of the current read transaction is considered to pass. Therefore, the abnormal mis-determination situation that the data comparison fails while the actual operation of the storage module is normal due to the uncertainty of the read data monitored when there may be a read-write conflict is avoided, and an accuracy of the abnormal determination of the storage module using an interface with mutually independent read channel and write channel is effectively improved. In addition, it is also avoided to develop a complex reference model to accurately simulate the read-write conflict processing characteristics similar to that of a storage module using an interface with a read channel and a write channel which are independent of each other. Namely, a developed reference model even if cannot simulate the read-write conflict characteristics can also be applied to the above solution of the present application, which has a positive meaning for accelerating the development progress of actual engineering projects and reducing development costs.

It should be understood that although the various steps in FIGS. 3-5 are shown in order as indicated by arrows, the steps are not necessarily performed in order as indicated by the arrows. Unless explicitly stated otherwise in this disclosure, the steps are not performed in the exact order shown and described, and may be performed in other orders. Moreover, at least some of the steps in FIGS. 3-5 may include multiple sub-steps or multiple stages that are not necessarily performed at the same time, but may be performed at different times. The order of performance of the sub-steps or stages is not necessarily sequential, but the sub-steps or stages may be performed in turn or alternately with other steps or at least some of the sub-steps or stages of other steps.

Figure 7:
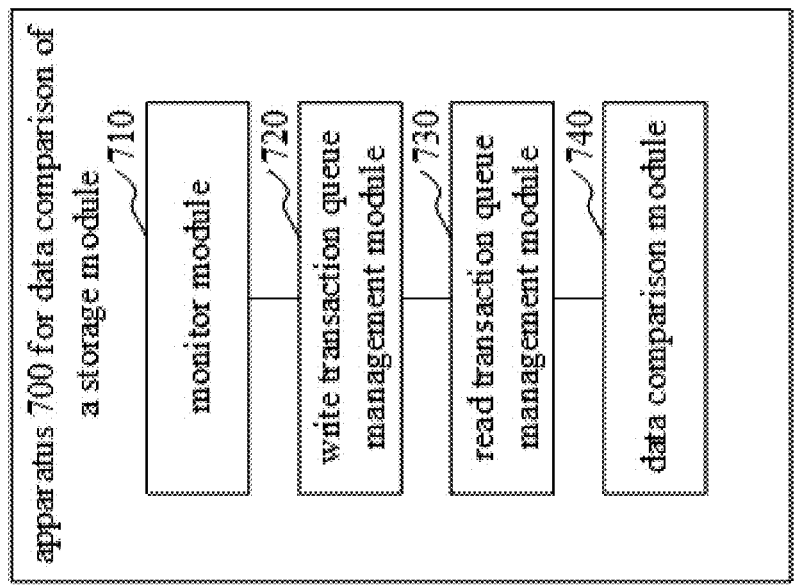
FIG. 7 is a block diagram of an apparatus of data comparison for a storage module according to an embodiment of the present application.

In one embodiment, as is shown in FIG. 7, there is provided, of data comparison for a storage module, an apparatus 700, comprising: a monitor module 710, a write transaction queue management module 720, a read transaction queue management module 730, and a data comparison module 740, wherein:

the monitor module 710 is configured for monitoring, using a monitor, read transactions and write transactions of the storage module;

the write transaction queue management module 720 is configured for storing, in a write transaction queue, a write transaction that is in-transit and a write transaction that has ended but may have a read-write conflict with a read transaction in a read transaction queue;

the read transaction queue management module 730 is configured for storing, in the read transaction queue, a read transaction that is in-transit and a read transaction that has ended but has not completed data comparison; and the data comparison module 740 is configured for performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

For specific definitions of the apparatus 700 for data comparison of the storage module, reference may be made to the above definitions of the method for data comparison of the storage module, and they are not described herein again. The above modules in the apparatus 700 for data comparison of the storage module are performed by a processor. The modules can be embedded in a hardware form or can be stored in a memory in the electronic device in a software form, so that the processor can call and execute operations corresponding to the modules.

Figure 8:
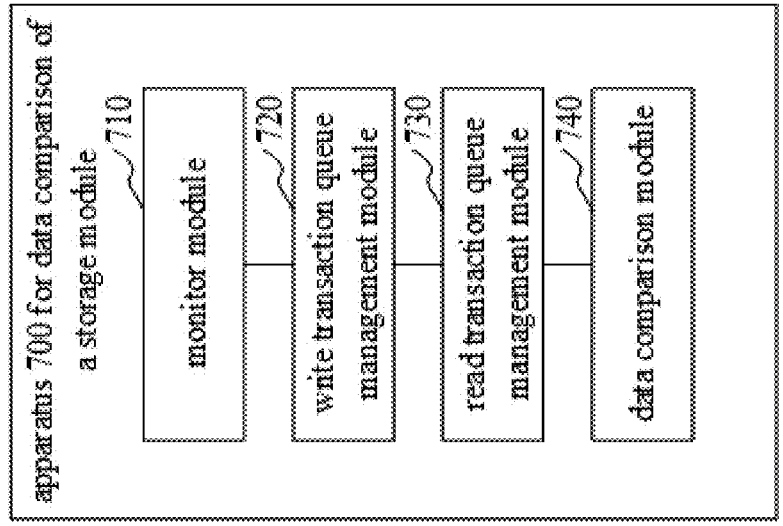
FIG. 8 is an internal structural diagram of a computer device in one embodiment of the present application.

In one embodiment, a computer device is provided. The computer device may be a server, an internal structure of which may be as is shown in FIG. 8. The computer device includes a processor, a memory, a network interface, and a data value database connected by a system bus. The processor of the computer device is configured to provide computing and control capabilities. The memory of the computer device comprises a non-volatile storage medium, an internal memory. The non-volatile storage medium stores an operating system, a computer program, and a data value database. The internal memory provides an environment for the operation of the operating system and the computer program in the non-volatile storage medium. The data value database of the computer device is configured to store data values for data comparison of the storage module. The network interface of the computer device is configured to communicate with an external terminal through a network connection. The computer program is executed by the processor to implement a method of data comparison for a storage module.

Those skilled in the art may appreciate that the structure shown in FIG. 8 is merely a block diagram of some of the structures relevant with the present application solution and is not intended to limit the computer device to which the present application solution applies, as particular computer devices may include more or less components than those shown in the figure, or combine certain components, or have a different arrangement of components.

In one embodiment, a computer device is provided, and comprises a memory and a processor. The memory has a computer program stored therein. The processor, based on executing the computer program, implements following steps:
 monitoring, using a monitor, read transactions and write transactions of the storage module;
 storing, in a write transaction queue, a write transaction that is in-transit and a write transaction that has ended but may have a read-write conflict with a read transaction in a read transaction queue;
 storing, in the read transaction queue, a read transaction that is in-transit and a read transaction that has ended but has not completed data comparison; and
 performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

In other embodiments, a processor, based on executing a computer program, further implements the steps of the method for data comparison of the storage module as described in any one of the embodiments above, and has corresponding beneficial effects.

In one embodiment, a computer-readable storage medium is provided, and stores thereon a computer program, which, based on being executed by a processor, implements following steps:
 monitoring, using a monitor, read transactions and write transactions of the storage
 storing, in a write transaction queue, a write transaction that is in-transit and a write transaction that has ended but may have a read-write conflict with a read transaction in a read transaction queue;
 storing, in the read transaction queue, a read transaction that is in-transit and a read transaction that has ended but has not completed data comparison; and
 performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

In an embodiment, a computer program, based on being executed by a processor, further implements the steps of the method for data comparison of the storage module as described in any one of the above embodiments and has corresponding beneficial effects.

It may be understood by those skilled in the art that all or part of processes of the methods of the embodiments described above may be implemented by hardware relevant to instructions of a computer program, which may be stored in a non-volatile computer-readable storage medium, and based on being executed, may include processes of the embodiments of the methods described above. Any reference to memory, storage, data value database, or other medium used in the embodiments provided in this application may include non-volatile and/or volatile memory, among others. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), rambus (Rambus) direct RAM (RDRAM), direct rambus dynamic RAM (DRDRAM), and rambus dynamic RAM (RDRAM), among others.

Various technical features of the above embodiments may be arbitrarily combined, and for the sake of brevity, not all possible combinations of the technical features in the above embodiments are described. However, as long as there is no contradiction in the combinations of the technical features, they should be considered as the scope of the present specification.

The above-mentioned embodiments only express several embodiments of the present application, and the description thereof is relatively specific and detailed, but should not be construed to limit the scope of the invention. It should be noted that, for a person skilled in the art, without departing from the concept of the present application, several variations and modifications may also be made, and fall within the scope of protection of the present application. Therefore, the protection scope of the present application shall be subject to the appended claims.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

The invention claimed is:

1. A method of data comparison for a storage module, the method comprising:
monitoring, using a monitor, read transactions and write transactions of the storage module;
storing, in a write transaction queue, a write transaction that is in-transit and a write transaction that has ended but may have a read-write conflict with a read transaction in a read transaction queue;
storing, in the read transaction queue, a read transaction that is in-transit and a read transaction that has ended but has not completed data comparison;
performing, for each ended read transaction in the read transaction queue, a data comparison on the ended read transaction by using a scoreboard; and
wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

2. The method according to claim 1, wherein storing, in the write transaction queue, the write transaction that is in-transit and the write transaction that has ended but may have the read-write conflict with the read transaction in the read transaction queue, comprises:
pushing a started write transaction into the write transaction queue based on the monitor monitoring the started write transaction; and
determining, based on the monitor monitoring an ended write transaction, whether each write transaction in the write transaction queue may have a read-write conflict with the read transaction in the read transaction queue, and deleting the write transaction which does not have the read-write conflict with the read transaction in the read transaction queue from the write transaction queue.

3. The method according to claim 2, wherein determining, based on the monitor monitoring the ended write transaction, whether each write transaction in the write transaction queue may have the read-write conflict with the read transaction in the read transaction queue, comprises:
determining that there may be a read-write conflict between a current write transaction and any one read transaction for each write transaction in the write transaction queue based on at an end time of the current write transaction, an end event of the any one read transaction in the read transaction queue is not triggered or just triggered, and an address accessed in the any one read transaction and an address accessed in the current write transaction overlap.

4. The method according to claim 2, further comprising: acquiring from the reference model an original value before writing of a write data value of the started write transaction at an address of the write data value and recording the original value in the started write transaction based on the monitor monitoring the started write transaction.

5. The method according to claim 2, further comprising: updating a value at an address of a write data value in the ended write transaction in the reference model with the write data value based on the monitor monitoring the ended write transaction.

6. The method according to claim 1, wherein storing, in the read transaction queue, the read transaction that is in-transit and the read transaction that has ended but has not completed data comparison, comprises:
pushing a started read transaction into the read transaction queue based on the monitor monitoring the started read transaction; and
deleting an ended read transaction from the read transaction queue after performing a data comparison on the ended read transaction using a scoreboard to complete the data comparison of the ended read transaction based on the monitor monitoring the ended read transaction.

7. The method according to claim 1, wherein performing, for each ended read transaction in the read transaction queue, the data comparison on the ended read transaction by using the scoreboard; and wherein the scoreboard determines that the data comparison on the ended read transaction passes based on (1) the data comparison between the read data value in the ended read transaction and the data value in the reference model at the address corresponding to the read data value fails and (2) the data comparison between the read data value in the ended read transaction and the any one value of the write data value and the original value before writing of the write data value at the address corresponding to the read data value in the one write transaction in the write transaction queue passes, wherein the one write transaction may have the read-write conflict with the ended read transaction, comprises:

determining whether an ended read transaction may have a read-write conflict with one write transaction in the write transaction queue, and recording a write data value and an original value before writing of the write data value of the one write transaction, which may have the read-write conflict with the ended read transaction, in the write transaction queue into an alternative value group based on the monitor monitoring the ended read transaction;

performing a data comparison on a read data value of the ended read transaction and a value at an address of the read data value in the reference model by using the scoreboard, and based on a failure of the data comparison, determining a comparison fail address of the read data value that fails the data comparison; and performing a data comparison on the read data value that fails the data comparison and each write data value and each original value at the comparison fail address of the alternative value group, and based on the data comparison on the read data value that fails the data comparison and any one of the each write data value and the each original value at the comparison fail address of the alternative value group passing, the scoreboard determining that the data comparison of the ended read transaction passes.

8. The method according to claim 7, wherein determining whether the ended read transaction may have the read-write conflict with the one write transaction in the write transaction queue, comprises:

determining that the ended read transaction and the one write transaction may have the read-write conflict based on at an end time of the ended read transaction, an end event of the one write transaction in the write transaction queue is not triggered or an end time of the one write transaction is later than a start time of the ended read transaction, and an address accessed by the one write transaction and an address accessed by the ended read transaction overlap.

9. The method according to claim 7, wherein the alternative value group is an associated value group, an index value of the associated value group is an address corresponding to a unit write data value of the one write transaction which may have the read-write conflict with the ended read transaction, and elements indexed by the index value are the unit write data value and a unit original value before writing of the unit write data value at the address of the one write transaction which may have the read-write conflict with the ended read transaction.

10. An apparatus of data comparison for a storage module, the apparatus comprising:

a monitor module configured for monitoring, using a monitor, read transactions and write transactions of the storage module;

a write transaction queue management module configured for storing, in a write transaction queue, a write transaction that is in-transit and a write transaction that has ended but may have a read-write conflict with a read transaction in a read transaction queue;

a read transaction queue management module configured for storing, in the read transaction queue, a read transaction that is in-transit and a read transaction that has ended but has not completed data comparison; and a data comparison module configured for performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

11. A computer device comprising a memory and a processor, wherein the memory stores a computer program, and based on executing the computer program, the processor implements steps of a method of data comparison for a storage module, the method comprising:

monitoring, using a monitor, read transactions and write transactions of the storage module;

storing, in a write transaction queue, a write transaction that is in-transit and a write transaction that has ended but may have a read-write conflict with a read transaction in a read transaction queue;

storing, in the read transaction queue, a read transaction that is in-transit and a read transaction that has ended but has not completed data comparison; and performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value in one write transaction in the write transaction queue passes, wherein the one write transaction may have a read-write conflict with the ended read transaction.

12. A non-transitory computer-readable storage medium, storing thereon a computer program, wherein based on being executed by a processor, the computer program implements steps of a method of data comparison for a storage module, the method comprising:

monitoring, using a monitor, read transactions and write transactions of the storage module;

storing, in a write transaction queue, a write transaction that is in-transit and a write transaction that has ended but may have a read-write conflict with a read transaction in a read transaction queue;

storing, in the read transaction queue, a read transaction that is in-transit and a read transaction that has ended but has not completed data comparison; and performing, for each ended read transaction in the read transaction queue, a data comparison on the ended read transaction by using a scoreboard; wherein the scoreboard determines that the data comparison on the ended read transaction passes based on (1) a data comparison between a read data value in the ended read transaction and a data value in a reference model at an address corresponding to the read data value fails and (2) a data comparison between the read data value in the ended read transaction and any one value of a write data value and an original value before writing of the write data value at an address corresponding to the read data value in one write transaction in the write transaction queue passes, wherein the one write transaction may have a read-write conflict with the ended read transaction.

* * * * *